(12) United States Patent
Doi et al.

(10) Patent No.: US 8,880,355 B2
(45) Date of Patent: Nov. 4, 2014

(54) EMISSION FACTOR CALCULATING APPARATUS AND EMISSION FACTOR CALCULATING METHOD

(75) Inventors: Yusuke Doi, Yokohama (JP); Keiichi Teramoto, Tokyo (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 559 days.

(21) Appl. No.: 13/217,934

(22) Filed: Aug. 25, 2011

(65) Prior Publication Data

US 2012/0053848 A1 Mar. 1, 2012

(30) Foreign Application Priority Data

Feb. 27, 2009 (JP) ................................. 2009-045932

(51) Int. Cl.
*G06F 19/00* (2011.01)
*H02J 3/32* (2006.01)
*H02J 3/46* (2006.01)
*G06Q 30/04* (2012.01)
*G06Q 50/06* (2012.01)
*H02J 13/00* (2006.01)
*H02J 3/38* (2006.01)

(52) U.S. Cl.
CPC .. *H02J 3/32* (2013.01); *Y02E 40/72* (2013.01); *H02J 3/46* (2013.01); *H02J 13/001* (2013.01); *Y04S 50/12* (2013.01); *G06Q 30/04* (2013.01); *H02J 3/382* (2013.01); *H02J 13/0006* (2013.01); *G06Q 50/06* (2013.01); *Y04S 10/40* (2013.01)
USPC ............................................ 702/24; 702/188

(58) Field of Classification Search
CPC ........ G01R 11/00; G01R 21/00; G06Q 50/06; G06Q 30/04; H02J 13/006; H02J 3/32; H02J 3/46; H02J 3/382; H02J 13/0006; H02J 13/001; Y04S 50/12; Y04S 10/40; Y04S 10/126; G07F 15/00
See application file for complete search history.

(56) References Cited

U.S. PATENT DOCUMENTS 5,119,390 A * 6/1992 Ohmori ............................ 372/25
6,732,540 B2 * 5/2004 Sugihara et al. ................ 62/177

(Continued)

FOREIGN PATENT DOCUMENTS

JP 2004-138516 A 5/2004
JP 2007-037226 A 2/2007

(Continued)

OTHER PUBLICATIONS

International Search Report and Written Opinion dated May 18, 2010 from PCT/JP2010/053128.

(Continued)

*Primary Examiner* — Carol S Tsai
(74) *Attorney, Agent, or Firm* — Ohlandt, Greeley, Ruggiero & Perle, L.L.P.

(57) ABSTRACT

According to one embodiment, an emission factor calculating apparatus includes a receiving unit, a received electricity (i.e., electric power) measuring unit, a generated electricity measuring unit, and an emission factor calculating unit. The receiving unit receives an emission factor of a higher-level system at first regular intervals. The received electricity measuring unit measures, as a received electricity, electricity received from the higher-level system and accumulated. The generated electricity measuring unit measures electricity generated with zero emission in a target system. The emission factor calculating unit calculates a substantial emission factor of the target system at regular intervals (i.e., at a fixed interval), based on a ratio between the received electricity and the measured electricity generated, and the emission factor of the higher-level system. The emission factor calculating unit informs a load or a lower-level system of the substantial emission factor.

8 Claims, 4 Drawing Sheets

(56) References Cited

U.S. PATENT DOCUMENTS

| | | | |
|---|---|---|---|
| 7,343,341 B2* | 3/2008 | Sandor et al. | 705/37 |
| 7,877,235 B2* | 1/2011 | McConnell et al. | 702/188 |
| 8,000,938 B2* | 8/2011 | Mcconnell et al. | 702/188 |
| 8,615,381 B2* | 12/2013 | Brown | 702/188 |
| 2003/0065471 A1* | 4/2003 | Tsuji et al. | 702/130 |
| 2003/0229572 A1* | 12/2003 | Raines et al. | 705/37 |
| 2004/0011066 A1* | 1/2004 | Sugihara et al. | 62/177 |
| 2008/0147465 A1* | 6/2008 | Raines et al. | 705/7 |
| 2010/0191998 A1* | 7/2010 | Moore | 713/340 |
| 2011/0087508 A1* | 4/2011 | McConnell et al. | 705/7.11 |

FOREIGN PATENT DOCUMENTS

| | | |
|---|---|---|
| JP | 2008-009489 A | 1/2008 |
| JP | 2008-097303 A | 4/2008 |

OTHER PUBLICATIONS

Japanese Office Action dated Jul. 3, 2012 from corresponding JP Patent Application No. 2009-045932; 7 pages.

English Translation of IPRP dated Sep. 22, 2011 from corresponding PCT/JP2010/053128; 6 pages.

* cited by examiner

EMISSION FACTOR CALCULATING APPARATUS AND EMISSION FACTOR CALCULATING METHOD

CROSS-REFERENCE TO RELATED APPLICATIONS

This application is a Continuation Application of PCT Application No. PCT/JP2010/053128, filed Feb. 26, 2010 and based upon and claiming the benefit of priority from prior Japanese Patent Application No. 2009-045932, filed Feb. 27, 2009, the entire contents of all of which are incorporated herein by reference.

FIELD

Embodiments described herein relate generally to an emission factor calculating apparatus and method that enable active demand-side management (DSM) of carbon dioxide emissions based on a carbon dioxide emission factor.

BACKGROUND

A technique exists of displaying the amount of carbon dioxide emitted with respect to electricity consumption to prompt users to minimize their carbon dioxide emissions (see, for example, JP-A [KOKAI] No. 2008-97303).

However, merely displaying the amount of emitted carbon dioxide does not directly minimize emissions, since reduction of emissions depends on what actions users actually take on the basis of the displayed amount. In the control of domestic electrical appliances and electricity supply subsystems, there is no method for minimizing carbon dioxide emissions. In particular, in a mixed electricity supply environment involving solar energy, fuel cells, wind power, and micro-grid equipment, there is no demand-side control method capable of dealing with a continuously varying energy mix. Accordingly, there is no method of promoting efficient demand-side actions or of effectively using surplus electricity generated by micro-grid devices (mismatch between supply and demand associated with micro-grid devices).

DETAILED DESCRIPTION

In general, according to one embodiment, an emission factor calculating apparatus includes a receiving unit, a received electricity (i.e., electric power) measuring unit, a generated electricity measuring unit, and an emission factor calculating unit. The receiving unit receives an emission factor of a higher-level system at first regular intervals. The received electricity measuring unit measures, as a received electricity, electricity received from the higher-level system and accumulated. The generated electricity measuring unit measures electricity generated with zero emission in a target system. The emission factor calculating unit calculates a substantial emission factor of the target system at regular intervals (i.e., at a fixed interval), based on a ratio between the received electricity and the measured electricity generated, and the emission factor of the higher-level system. The emission factor calculating unit informs a load or a lower-level system of the substantial emission factor.

The emission factor calculating apparatus of the embodiment can overcome the mismatch between supply and demand, and realize reduction of carbon dioxide emissions and positive use of surplus power.

Referring to the accompanying drawings, a detailed description will be given of an emission factor calculating apparatus according to an embodiment. In the embodiment and the examples thereof described below, like reference numbers denote like elements, and duplicate explanation is avoided.

In the embodiment, the emission factor (kg/kWh) of, for example, carbon dioxide is calculated from the actual energy mix (the ratio between power supplies) of a plurality of power generators of different characteristics including a generator that generates, with zero emission, electricity frequently varying in amount. The use of the calculation result enables an output adjustable load to produce a maximum output when a cheaper and lower-emission electricity is available. The zero emission electricity means the electricity generated by power supplies, such as a wind power generator and a photovoltaic system, which generate electricity without emissions of, for example, carbon dioxide.

The emission factor calculating apparatus of the embodiment realizes local production for local consumption, along with micro-grid equipment, i.e., various power supplies such as a rechargeable battery, a fuel-cell, a photovoltaic system and a wind power generator, which are located near the demand side. Between the demand side and the higher-level power system, the micro-grid equipment is interposed, and the emission factor calculating apparatus is also interposed for calculating the effect of the micro-grid equipment and balancing supply with demand. The emission factor calculating apparatus calculates, for example, the carbon dioxide emission factor based on the efficiency of the micro-grid equipment that varies momentarily, and informs the lower-level system or load of the calculation result via communication means (alternatively, the result may be published to allow the lower-level system or load to access it via the communication means). Based on the informed emission factor or a change therein, the lower-level system or load independently performs load control. It is a matter of course that a controller may concentrically perform load control referring to the emission factor, instead of the independent load control by the lower-level system or load.

Figure 1:
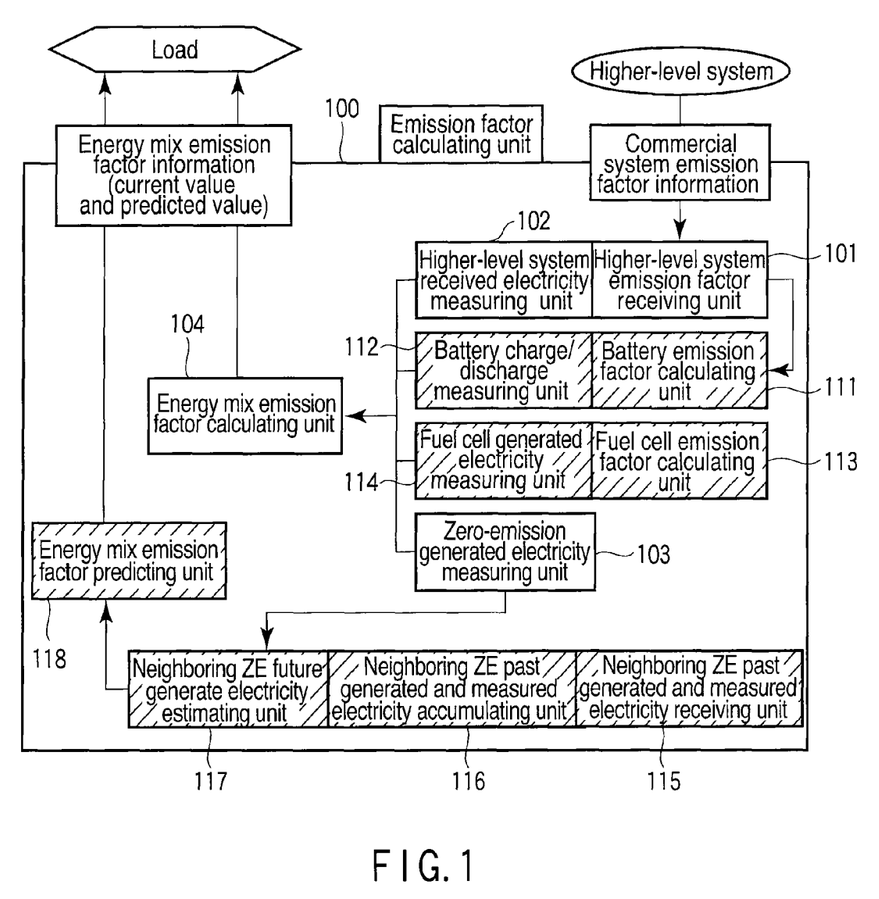
FIG. 1 is a block diagram illustrating an emission factor calculating apparatus according to an embodiment.

Referring first to FIG. 1, the emission factor calculating apparatus 100 of the embodiment will be described.

In FIG. 1, the blocks other than the hatched ones indicate the indispensable elements of the emission factor calculating apparatus 100, and the hatched blocks indicate optional elements. The indispensable elements comprise a higher-level system emission factor receiving unit 101, a higher-level system received electricity measuring unit 102, a zero-emission generated electricity measuring unit 103, and an energy mix emission factor calculating unit 104. The optional elements include a battery emission factor calculating unit 111, a battery charge/discharge measuring unit 112, a fuel cell emission factor calculating unit 113, a fuel cell generated electricity measuring unit 114, a neighboring ZE past generated and measured electricity receiving unit 115, a neighboring ZE past generated and measured electricity accumulating unit 116, a neighboring ZE future generated electricity estimating unit 117, and an energy mix emission factor predicting unit 118. These dispensable structural elements will be described later in fifth and sixth examples.

The higher-level system emission factor receiving unit 101 has a function of receiving emission factor information obtained by calculation in a higher-level system, and holding the emission factor for a preset time. More specifically, the unit 101 has communication means (in the case of WebService B2B-associated API, the communication means is its WSDL URL, SOAP Proxy object, etc.) capable of acquiring the emission factor of the higher-level system, inquires, using this means, the emission factor at regular intervals, or updates the emission factor by data output from the higher-level system, and stores, in its memory, the updated value and a limited number of preceding values. The preceding values are overwritten in the order from the oldest to the newest. The values stored in the memory are sent to the energy mix emission factor calculating unit 104 upon receiving an inquiry therefrom.

If the higher-level system is a commercial system, the emission factor of the higher-level system is calculated based on the ratio between the carbon dioxide emitted amount of a used fuel and the amount of sold electricity, which is determined from the operational planning of the system or the actual operational achievement of each dynamo. The values may be rough values resulting from the operation planning, or be detailed values resulting from measurements of fuel made at regular intervals. Further, in a local system or an in-plant system, the emission factor calculating apparatus 100 of the embodiment may be used.

Upon receiving an inquiry from the energy mix emission factor calculating unit 104, the higher-level system received electricity measuring unit 102 informs the calculating unit 104 of the accumulated amount of electricity received from the higher-level system.

Upon receiving an inquiry from the energy mix emission factor calculating unit 104, the zero-emission generated electricity measuring unit 103 informs the calculation unit 104 of the accumulated amount of electricity generated by a power supply, such as a wind generator system or a photovoltaic system, that does not emit, for example, carbon dioxide.

The energy mix emission factor calculating unit 104 operates at regular intervals (for regularly performing measurement). Assume here that a higher-level emission factor $Fs(t)$, a higher-level received electricity amount $Ps(t)$, and a zero-emission generated electricity amount $Pz(t)$ are given at a certain time point t. Based on the results of the two operations of the energy mix emission factor calculating unit 104 performed at time t (present measurement time) and at time t−1 (preceding measurement time) (namely, performed with a certain interval), it calculates substantial emission factor $F(t)$ at the time point t, using the following equation (1):

$$F(t)=Fs(t) \cdot \Delta Ps(t)/(\Delta Ps(t)+\Delta Pz(t)) \qquad (1)$$

In the above equation, regarding an arbitrary value X, $\Delta X(t)=X(t)-X(t-1)$ is defined.

Figure 2:
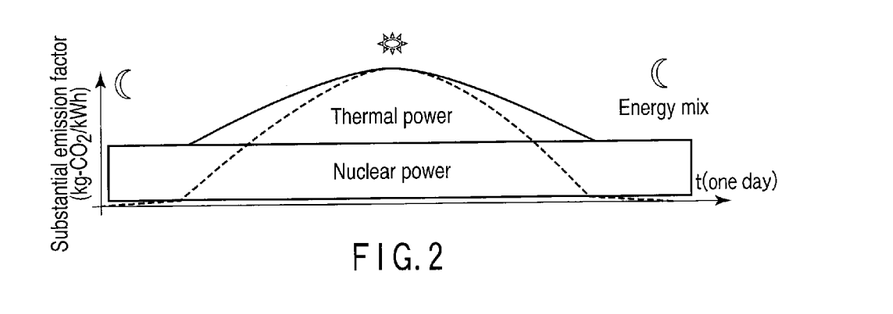
FIG. 2 is a schematic view illustrating a simplified variation example in substantial emission factor per one day.
Figure 3:
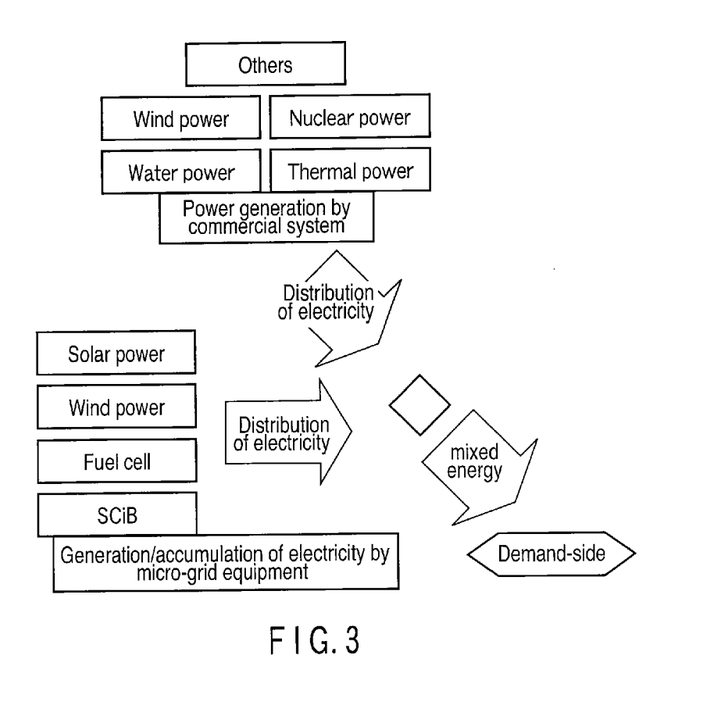
FIG. 3 is a view useful in explaining the concept of an energy mix.

In the embodiment, since an electricity accumulating meter is used, the consumption of electricity and the emission amount of carbon dioxide resulting therefrom are calculated based on a difference obtained at each preset interval. However, if the value of a sufficiently detailed ampere meter can be utilized, calculation utilizing its time integration may be performed. FIG. 2 illustrates a simplified variation example in substantial emission factor per one day, and FIG. 3 illustrates the concept of mixing energy output from a variety of energy sources.

The energy mix emission factor calculating unit 104 informs a load or a lower-level system of its calculated emission factor. To this end, communication means, such as Publish-Subscribe. Alternatively, Web-Service API may be prepared to receive an inquiry from the load or lower-level system. Further, the emission factor information calculated by the emission factor calculating apparatus 100 of the embodiment includes the following information items:

Measuring zone start time: Preceding measurement time point (t−1 in equation (1));

Measuring zone end time: Current measurement time point (t in equation (1)); and Emission factor: Emission factor calculated for the zone between the measurement start and end times ($F(t)$ in equation (1)).

The emission factor information acquired from the higher-level system may include the above three items. In this case, an emission factor transmitting unit incorporated in the higher-level system has a function of providing, in reply to an inquiry, emission factor information associated with a plurality of nearest zones. This enables the lower-level side to perform interpolation when the measuring zone is displaced. Further, if there is no great variation in the emission factor of the higher-level system, the emission factor information indicates a single emission factor and does not include information indicating the zone between the above-mentioned time points.

Note that even if the emission factor is slightly deviated from a correct value, when it has the same increase/decrease tendency, the utility value of the emission factor does not reduce except for the purpose of accounting. Therefore, at this time, the immediacy is regarded as important and the newest emission factor of the higher-level system is used as $Fs(t)$ in equation (1). In contrast, for calculation for accounting, it is necessary to use, as $Fs(t)$ in equation (1), an emission factor based on the result of accurate measurement in the zone between the above-mentioned time points. The method for this purpose will be described later in a third example.

Since at the start of the operation of the emission factor calculating apparatus, the differences ($\Delta Ps(t)$ and $\Delta Pz(t)$) in the accumulated electricity amount cannot be calculated, $F(t)$ is calculated at time point t=1, assuming that t starts from 0.

In the above-described embodiment, difference between supply and demand in the electricity network including the micro-grid equipment can be eliminated by feeding back, to the demand side, the carbon dioxide emission factor that varies every second. If the load side is controlled to use electricity when the emission factor is low, reduction of the amount of emitted carbon dioxide and effective use of surplus electricity can be balanced.

EXAMPLES

First Example

Application of Zero-Emission Power Supply to Load Control in the Demand-Side System A description will be given of an example of the embodiment, in which when an zero-emission power supply incorporated in a demand-side system or a micro-grid equipment is utilized, the emission factor calculating unit according to the embodiment is used to control adjustable loads, such as an electrical vehicle, an air conditioner and a water heater, (i.e., the loads that are relatively free from influence on the convenience of users even when the supply of electricity thereto is temporarily stopped).

Figure 4:
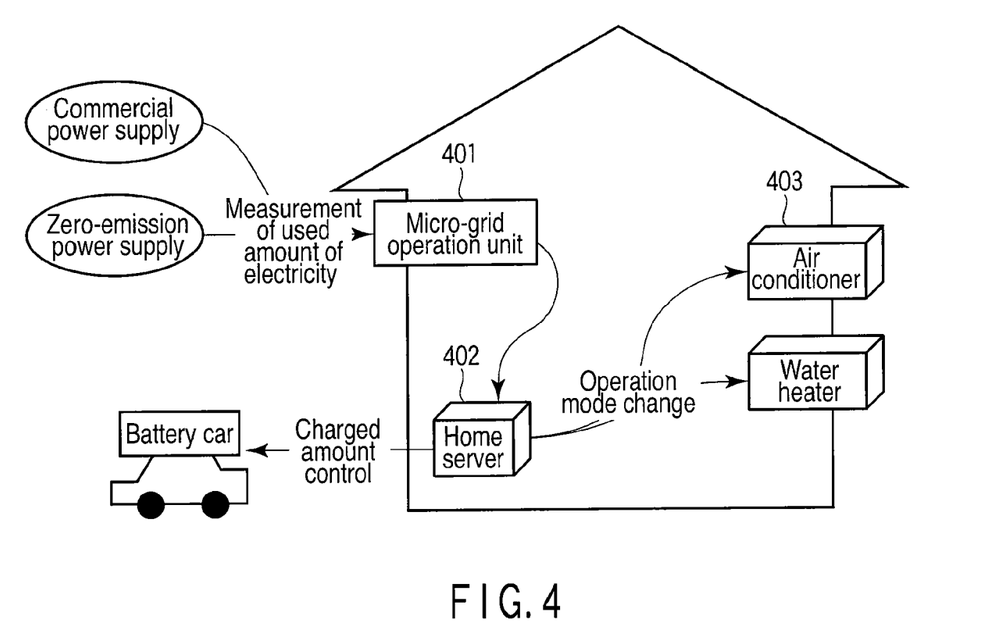
FIG. 4 is a view illustrating an example of air conditioning control in a house employing micro-grid equipment.

Referring first to FIG. 4, a description will be given of an example of air conditioning control performed in a house where micro-grid equipment is introduced. In the air conditioning control, the temperature is controlled to a set value. This control requires electricity proportional to the amount of control, but is not severe in control timing or temperature control precision. Even if the control precision is deviated slightly, it will not significantly influence the entire system and may merely involve users' somewhat unpleasantness.

In view of the above, a consideration will be given to communication in the micro-grid equipment between a micro-grid operation unit 401 including an emission factor calculating unit 100 according to the embodiment, and a home server 402 introduced to each house for controlling an air conditioner 403 as a load. In the embodiment, a simple model is considered in which the emission factor calculating unit 100 of the micro-grid operation unit 401 includes a web server, and acquires the substantially real-time emission factor by accessing a particular URL through HTTP. It is a matter of course that any other communication schemes including a Publish-Subscribe type communication scheme may be utilized. If the Publish-Subscribe type communication scheme is utilized, such an advantage of a known Push-type communication can be utilized, as that communication is controlled to be performed only when a change in carbon dioxide emission factor exceeds a preset threshold (or ratio).

Assume here that the air conditioner 403 can be controlled using ECHONET (a trademark) or a similar protocol. For communication between the home server 402 and the air conditioner 403, Bluetooth (a trademark), for example, is used. Further, the home server executes communication using a local network such as a VDSL network. Assume also that the home server of each house knows the network address (in this case, the URL for access) of the emission factor calculating unit 100 of the micro-grid operation unit 401 connected to said each house.

Furthermore, assume that the air conditioner 403 has a mode setting function of performing load adjustment. For instance, the mode setting function sets, for example, an ecological operation mode, a normal operation mode, an accelerated operation mode, etc. The ecological operation mode is a mode in which weaker air conditioning is performed than a normal one. Namely, in this mode, weak cooling is realized in summer, and minimal warming is realized in winter. Accordingly, the consumption of energy is lowest. The normal operation mode achieves normal air conditioning. The accelerated operation mode achieves excessive air conditioning (realizing a more cooled state in summer and a more warmed state in winter) using higher energy than the normal mode to enable a target temperature to be reached more quickly, or to realize future energy saving. When the accelerated operation is continued, control may be returned to that in the normal mode after an excessively controlled state is achieved. Namely, the state of controlling air conditioning to a value exceeding a target value set by a user may be continued or may not be continued.

For instance, in the case of, for example, ECHONET, ECHONET SPECIFICATION APPENDIX ECHONET equipment object detail rules, Version 3.21 Release b, published by ECHONET CONSORTIUM, stipulates, in Section 1.2.1, equipment object details of a domestic air conditioner class. The object details include an item "fast operation mode setting," where three exclusive modes—normal operation mode, fast operation mode and silent operation mode—are stipulated. Similarly, a property for setting three ecological operation modes—ecological mode, normal mode and accelerated mode—may be prepared. Further, the stipulations may be modified such that similar control is performed within the range of interpretation of the fast operation mode.

Assume here that the home server 402 performs control under the following policies (i) to (iii):

(i) If the emission factor F is not higher than a threshold $T_L$, the ecological operation mode of the currently operating air conditioner is set to "accelerated mode;"

(ii) If the emission factor F satisfies $T_R \geq F > T_L$ ($T_R$ is another threshold greater than $T_L$), the ecological operation mode of the currently operating air conditioner is set to "normal mode;" and (iii) If the emission factor F is higher than the threshold $T_R$, the ecological operation mode of the currently operating air conditioner is set to "ecological mode."

For instance, if $T_R$ is a constant average emission factor applied to the electricity of the commercial system, the normal operation mode is set during, for example, nighttime where there is surplus electricity (i.e., where the emission factor is lower than the average), while the ecological operation mode is set during, for example, daytime where thermal power plants must be operated. Note that if the micro-grid equipment generates energy with zero emission, the emission factor F is reduced, and therefore the threshold $T_L$ is determined in consideration of the level of the reduction.

Also note that in the micro-grid system connected to a large number of houses included in, for example, collective housing, if all houses perform control in the same way, such a power consumption cycle is repeated as in which electricity is used all at once when there is some surplus electricity, whereby the emission factor is degraded, and at this time the consumption of electricity is stopped again all at once. To avoid this, a protection logic may be introduced in which when the ecological operation mode is switched, a randomly set waiting time is interposed so that the switching will be performed only when the emission factor continuously satisfies a threshold during the waiting time.

The essence of the embodiment will not change even if the above-mentioned function of the home server is imparted to each load. Namely, also in this case, each load apparatus acquires its emission factor from the emission factor calculating apparatus, and operates in accordance with the acquired emission factor.

Further, in the case of a load having a higher flexibility than a simple three-stage flexibility, load control may be performed, without the threshold determination by the home server 402, such that the emission factor is directly read and the ratio of the read factor to the average emission factor is calculated to determine how much electricity is used. Further, although the above-mentioned example describes a method of using the emission factor calculating apparatus in a system including the micro-grid equipment employed in, for example, collective housing, and the loads and home servers 402 of the houses of the collective housing, the same advantage as the above can be obtained if a system equivalent to the above system is established in a structure that is employed in an office or a plant and comprises micro-grid equipment and control boards and loads incorporated in the devices connected to the micro-grid equipment.

In particular, a calculation load in, for example, a data center can be regarded as an adjustable load. In this case, the quality of services may be determined from the relationship between the calculation load and the environmental load (emission factor). The service quality can be balanced with the consumption of electricity by determining the number of the computers for realizing a desired service quality, from simulated control of the number of the computers and/or migration of loads between data centers.

Second Example

Calculation of Carbon Dioxide Emission Factor in Multilayer System

Figure 5:
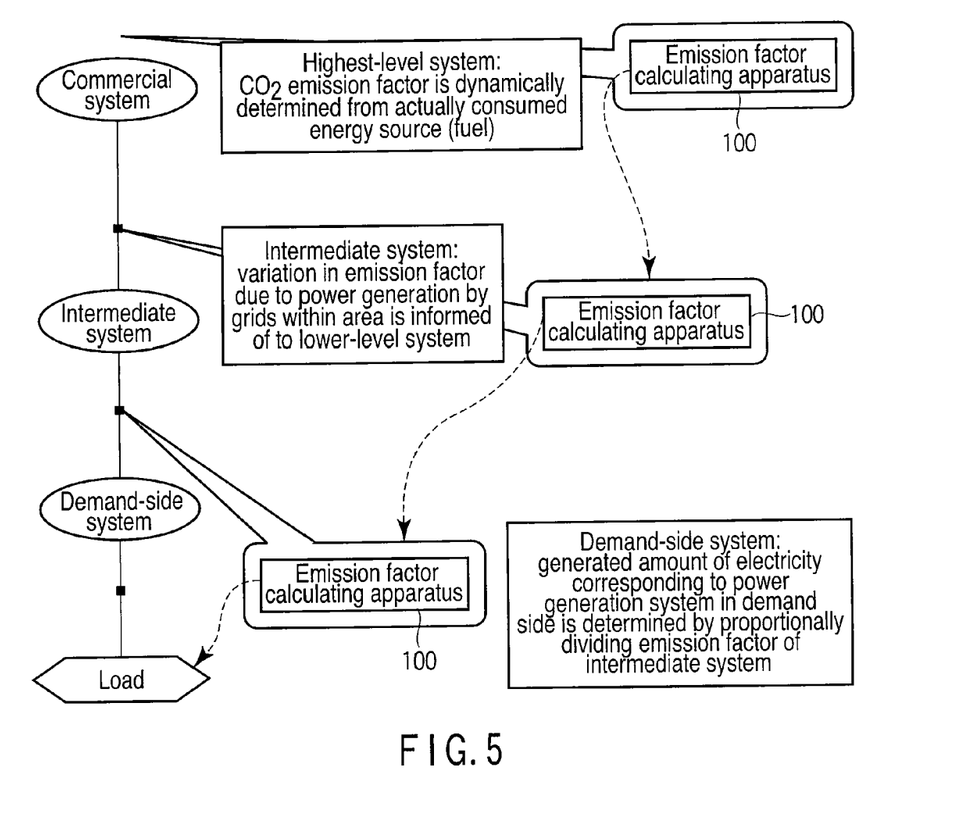
FIG. 5 is a view illustrating an example in which a load is connected to a commercial system, an intermediate system and a demand-side system.

FIG. 5 shows an example where loads are connected via a commercial system, an intermediate system for controlling, for example, districts, and customer systems existing in collective housing or a business institution. In this example, the intermediate system utilizes the emission factor information acquired by the commercial system, and sends, to the customer systems, the emission factor information acquired by proportionally dividing the emission factor information from the commercial system, and the environmental efficiency of the electricity generated by the micro-grid equipment of the intermediate system.

In view of the embodiment, it is a natural expansion to use the emission factor, calculated in the higher-level system, as one energy source for proportional division in the lower-level system.

Third Example

Accounting of the Amount of Emitted Carbon Dioxide

As one embodiment, application of the embodiment to the accounting of the amount of emitted carbon dioxide is regarded. Reduction of the amount of emitted carbon dioxide is now strongly required by, for example, the Kyoto Protocol, whereas engagement with the reduction of the emitted amount of carbon dioxide not in plants, but in offices, shops and ordinary houses, is rather low. Various causes exist, and exact causes cannot easily be determined. However, it is partly because the individual loads are small and the result of the engagement with the reduction is not balanced with the cost. Further, the fact that the incentive to reduce the emitted amount of carbon dioxide is hard to obtain is another significant cause for the low engagement with the reduction of the same.

Attention is now paid to the fact that the consumption of electricity is a main cause of carbon dioxide emission not in plants, but in offices, shops and ordinary houses, and an attempt to reduce the substantial amount of emissions will be made. As means for realizing this, zero-emission energy produced by, for example, a photovoltaic system is effectively used to suppress, in particular, the peak of power consumption during daytime in summer, thereby equalizing the consumption of electricity. By equalizing the power consumption, in particular, in Japan, the ratio of nuclear energy generation is enhanced to further reduce the amount of emitted carbon dioxide.

For the effective introduction of zero-emission energy, it is considered effective to impart an incentive by taking part in carbon dioxide emissions trading. In the prior art, the amount of emissions is determined by multiplying the consumed power by an emission factor as a constant. However, for the pattern of power consumption in a house or an office, in which the peak of consumption is clear, peak-cut effect can be realized by calculating a substantial emitted amount using a dynamic (variable) emission factor according to the embodiment. Further, if a technique, unique to the embodiment, of using the emission factor as a signal for control of another load is employed, reduction of the amount of emissions by peak cutting is automatically achieved.

The method of calculating the amount of emitted carbon dioxide will now be again described. The amount of emitted carbon dioxide can be calculated by multiplying the consumed power (kWh) by the current emission factor (kg/kWh). In a more precise sense, a method may be employed in which, for example, sufficiently accurate polynomial approximation is executed on the emission factor and the amount of consumed power that vary with time, and the approximation results are integrated. However, measurement or modeling for determining the accuracy is hard to establish. Because of this, in the embodiment, the amount of emissions is determined by the method described below.

Firstly, synchronization in measuring zone is performed. For this, a clock synchronization mechanism (known means, such as NetworkTime Protocol or IEEE1588, may be used) is used for clock synchronization, thereby synchronizing the measuring zone of the higher-level system with that of the lower-level system with high accuracy.

For each of all power supplies of a non-zero emission factor (including the higher-level system or a fuel cell using a gas as fuel), the amount of electricity consumed in a measuring zone is multiplied by the emission factor corresponding to the measuring zone. The resultant values are summed up to thereby calculate the amount of emissions in the measuring zone. To this end, it is necessary to calculate the emission amount and emission factor of the lower-level system after the emission factor of the higher-level system is calculated and received. More specifically, the energy mix emission factor calculating unit 104 individually executes the following two processes:

1. At regular intervals synchronized with the higher-level system, the electricity received from the higher-level system and the electricity of each power supply included in the micro-grid equipment are measured and stored in respective memories. Since at this time, the emission factor of the higher-level system is not yet acquired, a value (−1 in this example) indicating the fact is stored.

2. After the calculation of the emission factor of the higher-level system is finished, the emission factor information is received and stored in the higher-level-system emission factor term of the corresponding memory, and at the same time, emission factor calculation is performed using the above-mentioned equation (1), whereby the calculated emission factor is stored in the memory.

In this case, the energy mix emission factor calculating unit 104 comprises a memory or a database that comprises the following entries (i) to (vi). The entries can be arranged in a time-series manner. Based on the data in the entries, $\Delta Ps(t)$ and $\Delta Pz(t)$ in the equation (1) are calculated.

(i) Measurement zone end time: Measurement time point (ii) Amount of electricity received from higher-level system: Accumulation value, at the measurement time point, of the amounts of electricity received from the higher-level system (iii) Higher-level-system emission factor:

Emission factor calculated in the higher-level system (a negative value means that the emission factor is not yet calculated)

(iv) Measured zero-emission electricity:

Accumulated zero-emission electricity at the measurement time point (v) Emission factor: Substantial emission factor of the system in question in the measurement zone (a negative value means that the emission factor is not yet calculated)

(vi) Emission amount: Substantial emission amount of the systems and/or loads including the system in question Further, upon receiving an inquiry concerning emission factor information from a load or lower-level system, the energy mix emission factor calculating unit forms emission factor information from the newest memory data with a calculated emission factor, and the memory data obtained immediately before the newest memory data, and reports the information to the load or lower-level system.

To include the calculated emission amount within the frame of the emission trading, the following scheme will now be proposed. Irrespective of which scheme is employed, substantial and automatic calculation of the emission factor, and load control based on the calculated emission factor, are unique ingenuity for enhancing the effect of introduction of the micro-grid equipment.

Scheme 1: The baseline for the amount of carbon dioxide emitted when electricity is used is set to the amount obtained by multiplying the average emission factor of the power systems by the total amount of electricity consumed: In this scheme, the amount obtained by multiplying the average emission factor (i.e., currently used emission factor) of the power systems by the total amount of electricity consumed is used as a baseline amount in the baseline-and-credit approach. As a result, credit corresponding to the introduced micro-grid equipment is automatically imparted to ordinary houses even if they do not consider such a complex concept as emission credit. This enhances an incentive to the introduction and use of the micro-grid equipment.

Scheme 2: Emission credit assignment (shift of an emission amount from an electricity company) is automatically determined from the contract size of electricity: In this scheme, emission credit assignment is automatically performed by the cap-and-trade approach. This scheme requires the responsibility corresponding to the contract size of electricity, and may have a stronger effect of reducing the emission amount. However, it is considered difficult for an energy company to impose such a constraint as emission credit to a client, and therefore an appropriate institutional design is required.

Further, as described in the second example, there may be a case where the micro-grid equipment exists in plural layers (plural systems). In this case, the emission amount calculated in the embodiment is the sum of the amounts of carbon dioxide emitted when all loads included in each system of each layer (i.e., each of the higher-level, intermediate-level, lower-level systems, etc.) are used. Therefore, where the micro-grid equipment exists in plural layers, if the emission amount reduction effect is computed in each layer, it is redundantly computed. To avoid this, the following schemes are considered for proportional dividing of the emission amount of each layer:

Scheme 1: The intermediate layer (intermediate system) includes lower-level systems with the emission factor calculating unit according to the embodiment, and lower-level systems without the same. Assume here that the emission amount and emission credit of the intermediate layer are obtained by subtracting, from the emission amount and emission credit of itself, the sum of the emission amounts of the lower-level systems with the emission factor calculating unit, and the sum of the emission credit values of the lower-level systems with the emission factor calculating unit, respectively. As a result, the emission reduction effect by the introduction of the micro-grid equipment in the intermediate layer is assumed to be the sum of the reduction effects of the lower-level systems with no emission factor calculating unit.

Scheme 2: In addition to the above scheme 1, in the lower-level systems with the emission factor calculating apparatus of the embodiment, emission amount calculation based on an emission factor supplied from a higher-level layer than the intermediate layer, and emission amount calculation based on an emission factor including the effect of the micro-grid equipment of the intermediate layer, are performed, whereby the difference between these calculations is shifted as the contribution of the intermediate layer from the emission credit of the lower-level systems to the intermediate layer.

Regardless of whether any one of the above-mentioned schemes, or a similar scheme, is employed, the function of calculating a substantial emission factor according to the embodiment, and the function of calculating a substantial emission amount in a structure in which the function of calculating the substantial emission factor is employed in a plurality of layers, are realized by the energy mix emission factor calculating unit 104 unique to the embodiment.

Fourth Example

Handling of Three or More Energy Sources

In the above-mentioned examples, for facilitating the description, only two energy sources, i.e., the higher-level system and the zero-emission power supply, are taken into consideration. Actually, however, use of cogeneration of heat and electricity realized by a gas turbine engine or a fuel cell is now being thought. In this case, if the supply of hot water is regarded as the first object and the supply of electricity is regarded as the second object, the electricity secondarily generated when a required amount of hot water is produced can also be considered zero-mission electricity. On the other hand, there is an idea that the amount of consumed fuel, such as gas, which inevitably involves the emission of carbon dioxide gas, is measured, and the loss calculated from the thermal utilization efficiency or the amount of hot water is counted as the emission amount for generating electricity.

Where as in the latter idea, anathermal gas is emitted when the micro-grid equipment is used to generate electricity, it is necessary to generalize the calculation equation (the equation (1) in the embodiment), employed in the mission factor calculating unit, as recited below.

Assume here that the amount of accumulated electricity of each of the N power supplies at a time point t is set as Pi(t) (i is a power supply identification number ranging from 1 to N), that the emission factor of each power supply in a time zone t−1: t is set as Fi(t), and that the sum of power consumptions in the time zone t−1: t is given by the following equation (2):

$$P_{sum}(t) = \sum_{i=1}^{N} \Delta P_i(t) \quad (2)$$

In this case, the substantial emission factor F(t) of a certain system at the time zone t−1: t is given by the following equation (3):

$$F(t) = \sum_{i=1}^{N} \left\{ \frac{\Delta P_i(t)}{P_{sum}(t)} \cdot F_i(t) \right\} \quad (3)$$

Fifth Example

Handling of Rechargeable Battery

Consideration is given to a case where the micro-grid equipment includes a rechargeable battery or capacitor (hereinafter, any element having a function equivalent to the rechargeable battery will be referred to simply as a rechargeable battery), such as an SCiB (a trademark). The rechargeable battery enables time shift of the electrical energy. For instance, in a sunny interval in winter, excessively generated electricity is accumulated, and is discharged during a rainy or snowy day in which demand for warming energy is increased. At this time, the rechargeable battery serves as both a load and a power supply.

A description will be given of a method of controlling a rechargeable battery according to the embodiment.

The basic algorithm of rechargeable battery control is to keep the middle value of the capacity of the battery as much as possible in order to suppress short-time fluctuation in capacity. For instance, the way of loading is monitored by monitoring a power supply frequency or voltage, and discharge is started when excessive load (reduction of frequency or drop of voltage) occurs, and charge is performed when load reduction (increase of frequency or increase of voltage) occurs. Further, there is a case where automatic refresh operation (full-charge→discharge cycle) is performed. These processes are merely performed to cope with short-term fluctuation in capacity, and basically, control is performed to maintain the center value of the capacity on a long-term basis. More specifically, such a method may be employed as in which charge/discharge is performed to reach the center value of the capacity within an allowable range of fluctuation in voltage and/or frequency, based on the current voltage and frequency (assuming that the normal voltage is 101 V, and the normal frequency is 50 or 60 Hz, and that the allowable range of fluctuation in voltage is, for example, ±6 V, and that of fluctuation of frequency is, for example, ±0.2 Hz). Namely, assuming that the complete discharge and full-charge are set as 0 and 1, respectively, for a capacity c, it is determined whether charge or discharge should be performed when, for example, a voltage v is applied, based on whether the value given by the following equation (voltage charge/discharge function Cv (c, v)) is positive or negative:

$$Cv(c,v)=v-95+12 \cdot c$$

If the value given by this equation is positive, discharge is performed, while if the value is negative, charge is performed. It is a matter of course that if $c \geq 1$, no charge is performed, and if $c \leq 0$, discharge cannot be performed.

A description will now be given of a general rechargeable battery control algorithm for reducing emissions, which can be utilized in various environments in association with the amount of electricity generated by the power supplies connected to the micro-grid equipment. This algorithm is realized by the emission factor calculating apparatus of the embodiment.

Briefly, it may be designed such that the micro-grid equipment charges electricity if the power supplies connected to the micro-grid equipment generate a large amount of electricity, and discharges electricity if the power supplies generate a small amount of electricity. However, it should be noted that the amount of electricity generated varies in accordance with the properties of each micro grid device or with the operation state of each electric appliance connected to each micro grid device. In light of this, the algorithm employs the power quality of the system, i.e., the emission factor.

In this algorithm, the past statistical values of the emission factor are used. Assume here that from the operation history so far, a value $F_h$ which indicates the average of the upper 95% of the emission factors, and a value $F_l$ which indicates the average of the lower 95% of the emission factors, are determined. In particular, under the condition of $F_h > F > F_l$, charge/discharge is controlled based on the relationship between a current capacity c and the emission factor F. For instance, in FIG. 6, charge is performed in the hatched area, and discharge is performed in the other area. By thus controlling the charge/discharge operation using the emission factor F, control considering carbon dioxide emissions is possible.

Figure 6:
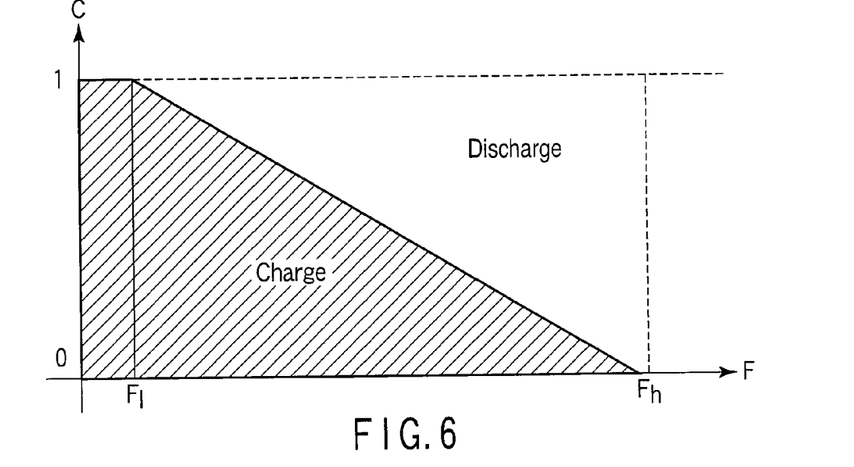
FIG. 6 is a graph illustrating an example of control for determining from a current capacity c and an emission factor F whether charge or discharge is to be performed.

As a spontaneous expansion of the above algorithm, the control shown in FIG. 6 may be modified such that only the electricity contributing to a higher quality environment is positively accumulated, and/or discharge is performed only when the environment is degraded.

Regardless of the above-mentioned algorithm or other algorithms, precise calculation of the emission factor of the electricity supplied to a rechargeable battery contributes to the spread of a better operation algorithm. In the calculation of the emission factor, the power quality obtained during charge is divided proportionally, and a charge loss is added thereto. The resultant power quality is regarded as the final power quality. However, for the use of accounting as described in the third example, the emission factor during discharge is regarded as zero since it is reasonable that emission is finished during charge.

When the emission factor is used for demand-side control, the emission factor $F_b(N)$ of a rechargeable battery obtained after charge is performed N times can be determined from, for example, the following recurrence equation pair:

$$F_b(0)=0$$

$$c_p(0)=0$$

$$F_b(i+1)=(F_b(i) \cdot c_p(i)+F_c(i) \cdot c_c(i))/(c_p(i)+c_c(i))$$

$$c_p(i+1)=c_p(i)+c_c(i)-d(i) \tag{4}$$

where $c_p(i)$ is the charge rate (a real number ranging from 0 to 1) immediately before the start of the $(i+1)^{th}$ charge operation, $F_c(i)$ is the emission factor of input electricity in the $i^{th}$ charge operation (this emission factor is calculated by the emission factor calculating unit based on the emission factors and electric energy of all power supplies connected to the system), and $c_c(i)$ is a charge rate difference corresponding to the amount of electricity charged in the $i^{th}$ charge operation. Further, d(i) is a charge rate difference during discharge, which is obtained by expressing, in terms of a reduction of the charge rate, the amount of discharge obtained after the $i^{th}$ charge and before $(i+1)^{th}$ charge.

Note that computationally, it is necessary to finish one charge operation within a measuring zone since $F_c(i)$ is effective only in the measuring zone. Even if the charge operation actually continues, the calculation using the equations (4) is carried out when the measuring zone is ended.

The emission factor calculating apparatus of the embodiment performs the above-mentioned calculation using the battery emission factor calculating unit 111 and the battery charge/discharge measuring unit 112. The battery emission factor calculating unit 111 performs the calculation using the equations (4) in synchronism with the measuring zone of the energy mix emission factor calculating unit 104, thereby updating $F_b(i)$ and $c_p(i)$ stored in its built-in memory, using, for example, the emission factor $F_c(i)$ acquired from the energy mix emission factor calculating unit 104 and corresponding to the charge/discharge operations. The battery charge/discharge measuring unit 112 measures $d(i)$ and $c_c(i)$ included in the equations (4), and outputs them to the battery emission factor calculating unit 111.

The above-described structure enables the calculation of the emission factor of the rechargeable battery with the varying environmental equality of electricity.

Sixth Example

Future Prediction by Cooperation of Zero-Emission Grids

It is known that there is a strong relationship between the amounts of natural energy generated by a photovoltaic systems, wind-power generation, etc., and the amount of energy generated in the neighboring space time. In simple terms, it is strongly possible that if a place near a target place is sunny, the target place was sunny in near past or will be sunny in near future, and that if the near place is windy, the target place was windy in near past or will be windy in near future.

This tendency may be utilized. Namely, a correlation model concerning the amount of zero-emission (ZE) electricity of a target system and the amount of the ZE electricity of another system near the target system, assumed in near past (e.g., 5 minutes before), can be obtained by collecting information indicating the ZE electricity amount of the another system, and applying a known space-time correlation analysis method.

If the correlation model is obtained, the near-future ZE electricity amount of the target system can be determined, along with its reliability, based on the current ZE electricity amount of the neighboring system. Utilizing this, the future emission factor may be predicted, and emission factor prediction information may be output as information to be added to the emission factor information. In FIG. 1, the neighboring ZE past generated and measured electricity receiving unit 115 receives measured electricity from the zero-emission generated electricity measuring unit 103. The neighboring ZE past generated and measured electricity accumulating unit 116 accumulates the past measured values. The neighboring ZE future generated electricity estimating unit 117 updates the space-time correlation analysis model and predicts the amount of electricity generated in near future. The energy mix emission factor predicting unit 118 replaces, in the equation (1), the ZE generated electricity amount $\Delta Pz$ with a predicted value of the amount of electricity generated with zero emission, thereby calculating a predicted future energy mix emission factor.

In the loads or lower-level systems, it is detected whether the current emission factor is on an upward or downward trend, based on the difference between the current emission factor and the predicted future emission factor, whereby the time when they should operate is advanced or delayed. In general terms, it is reasonable that adjustable loads (such as an air conditioner) should be used early if the emission factor is on the upward trend, and be used late if the emission factor is on the downward trend. For instance, in the policy stipulated above, it is determined whether the emission factor is on the upward trend, on the downward trend, or at the same level, and different $T_R$ and $T_L$ values are used in each of the determination results.

The flow charts of the embodiments illustrate methods and systems according to the embodiments of the invention. It will be understood that each block of the flowchart illustrations, and combinations of blocks in the flowchart illustrations, can be implemented by computer program instructions. These computer program instructions may be loaded onto a computer or other programmable apparatus to produce a machine, such that the instructions which execute on the computer or other programmable apparatus create means for implementing the functions specified in the flowchart block or blocks. These computer program instructions may also be stored in a computer-readable memory that can direct a computer or other programmable apparatus to function in a particular manner, such that the instruction stored in the computer-readable memory produce an article of manufacture including instruction means which implement the function specified in the flowchart block or blocks. The computer program instructions may also be loaded onto a computer or other programmable apparatus to cause a series of operational steps to be performed on the computer or other programmable apparatus to produce a computer programmable apparatus which provides steps for implementing the functions specified in the flowchart block or blocks.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An emission factor calculating apparatus comprising:
a receiving unit configured to receive an emission factor of a higher-level system at first regular intervals;
a received electricity measuring unit configured to measure, as a received electricity, electricity received from the higher-level system and accumulated;
a generated electricity measuring unit configured to measure electricity generated with zero emission in a target system; and
an emission factor calculating unit configured to calculate a substantial emission factor of the target system at second regular intervals, based on a ratio between the received electricity and the measured electricity generated, and the emission factor of the higher-level system, the emission factor calculating unit informing a load or a lower-level system of the substantial emission factor.

2. The apparatus according to claim 1, further comprising:
a generated electricity receiving unit configured to receive a measured value of electricity generated with zero emission by a neighboring device that does not belong to the target system;
an accumulating unit configured to accumulate the measured value of electricity;
an estimating unit configured to estimate an amount of electricity considered to be generated with zero emission in future in the target system, based on a space-time correlation between the measured value of electricity and the generated electricity measured by the generated electricity measuring unit; and
an emission factor calculating unit configured to calculate a future substantial emission factor based on the amount of electricity considered to be generated in future.

3. The apparatus according to claim 2, wherein
the electricity generated with zero emission is generated by a rechargeable battery; and
when the electricity generated with zero emission is generated by the rechargeable battery, the emission factor calculating unit calculates the substantial emission factor also based on an emission factor of the rechargeable battery.

4. The apparatus according to claim 2, wherein the electricity generated with zero emission is generated by a fuel cell; and when the electricity generated with zero emission is generated by the fuel cell, the emission factor calculating unit calculates the substantial emission factor also based on an emission factor of the full cell.

5. An emission factor calculating method comprising:

receiving an emission factor of a higher-level system at first regular intervals;

measuring, as a received electricity, electricity received from the higher-level system and accumulated;

measuring electricity generated with zero emission in a target system; and calculating a substantial emission factor of the target system at second regular intervals, based on a ratio between the received electricity and the measured electricity generated, and the emission factor of the higher-level system, the calculating the substantial emission factor emission factor including informing a load or a lower-level system of the substantial emission factor.

6. The method according to claim 5, further comprising:

receiving a measured value of electricity generated with zero emission by a neighboring device that does not belong to the target system;

accumulating the measured value of electricity;

estimating an amount of electricity considered to be generated with zero emission in future in the target system, based on a space-time correlation between the measured value of electricity and the generated electricity measured; and calculating a future substantial emission factor based on the amount of electricity considered to be generated in future.

7. The method according to claim 6, wherein the electricity generated with zero emission is generated by a rechargeable battery; and when the electricity generated with zero emission is generated by the rechargeable battery, the calculating the future substantial emission factor calculates the substantial emission factor also based on an emission factor of the rechargeable battery.

8. The method according to claim 6, wherein the electricity generated with zero emission is generated by a fuel cell; and when the electricity generated with zero emission is generated by the fuel cell, the calculating the future substantial emission factor calculates the substantial emission factor also based on an emission factor of the full cell.

* * * * *

UNITED STATES PATENT AND TRADEMARK OFFICE
CERTIFICATE OF CORRECTION

PATENT NO.         : 8,880,355 B2                                              Page 1 of 1
APPLICATION NO.    : 13/217934
DATED              : November 4, 2014
INVENTOR(S)        : Doi et al.

It is certified that error appears in the above-identified patent and that said Letters Patent is hereby corrected as shown below:

On the Title Page

Column 1, Line 15, under "Related U.S. Application Data":

Item (63) – please add: -- Continuation of application No. PCT/JP2010/053128, filed on February 26, 2010 --.

Signed and Sealed this
Seventeenth Day of March, 2015

Michelle K. Lee
*Director of the United States Patent and Trademark Office*